(12) United States Patent
Fell et al.

(10) Patent No.: US 7,580,580 B1
(45) Date of Patent: Aug. 25, 2009

(54) METHOD FOR COMPRESSION OF TWO-COLOR ANTI ALIASED IMAGES

(75) Inventors: Richard G. Fell, San Jose, CA (US); Thomas G. O'Neill, Mountain View, CA (US); Jordan M. Slott, Durham, NC (US)

(73) Assignee: Sun Microsystems, Inc., Santa Clara, CA (US)

( * ) Notice: Subject to any disclaimer, the term of this patent is extended or adjusted under 35 U.S.C. 154(b) by 725 days.

(21) Appl. No.: 11/180,407

(22) Filed: Jul. 12, 2005

(51) Int. Cl.
  G06K 9/36 (2006.01)
  G06K 9/46 (2006.01)
  G09G 5/00 (2006.01)
  H04N 7/12 (2006.01)
  H04N 11/02 (2006.01)
  H04N 11/04 (2006.01)

(52) U.S. Cl. .............. 382/232; 382/236; 382/245; 382/269; 345/611; 375/240.01

(58) Field of Classification Search ........... 382/232, 382/236, 245, 269; 345/611; 375/240.01, 375/240.23, 240.24
See application file for complete search history.

(56) References Cited

U.S. PATENT DOCUMENTS

| | | | |
|---|---|---|---|
| 5,086,439 A | 2/1992 | Asai et al. ............... 375/122 |
| 5,606,940 A | 3/1997 | Shafer et al. ............. 123/90.12 |
| 5,684,895 A | 11/1997 | Harrington ................. 382/233 |
| 5,793,381 A | 8/1998 | Edberg et al. .............. 345/467 |
| 5,844,508 A | 12/1998 | Murashita et al. ............. 341/51 |
| 6,034,700 A * | 3/2000 | Rumph et al. ............... 345/441 |
| 6,501,856 B2 | 12/2002 | Kuwano et al. ............. 382/194 |
| 6,522,330 B2 | 2/2003 | Kobayashi .................. 345/467 |
| 6,574,364 B1 * | 6/2003 | Economidis et al. ........ 382/166 |
| 6,842,541 B2 | 1/2005 | Curry ......................... 382/270 |
| 7,109,997 B1 * | 9/2006 | Callahan et al. ............ 345/555 |
| 2004/0135790 A1 | 7/2004 | Moore ........................ 345/589 |
| 2004/0208366 A1 | 10/2004 | Kuwata ...................... 382/171 |
| 2006/0133690 A1 * | 6/2006 | Bloomberg et al. ......... 382/269 |

* cited by examiner

*Primary Examiner*—John B Strege
(74) *Attorney, Agent, or Firm*—Gunnison, McKay & Hodgson, L.L.P.; Philip J. McKay

(57) ABSTRACT

A method for compressing two color anti-aliased images takes advantage of the fact that when two color anti-aliased images are present, it is often the case that the two base colors appear in adjacent or continuous series or "runs" of pixels representing the same color. According to one embodiment to the present invention, these runs are identified and then the color and run length are encoded to produce increased compression efficiency.

2 Claims, 7 Drawing Sheets

METHOD FOR COMPRESSION OF TWO-COLOR ANTI ALIASED IMAGES

FIELD OF THE INVENTION

The present invention relates generally to compression of video images and, in particular, to a method of compression/decompression for two color images that have been subjected to anti-aliasing.

BACKGROUND OF THE INVENTION

The rise of multimedia computing appliances and digital video transmission has led to an increased need to store and manipulate many-colored and complex digital images. Examples of many-colored and complex digital images include: digital photographic images of the natural world, whether taken with a digital camera or digitized from an analog camera print; computer-generated images of the natural world; and/or computer-generated images which include anti-aliased text or graphics.

In particular, anti-aliased images are increasing in both frequency of occurrence and importance in the art. This is primarily due to the increased expectations regarding visual appearance of the user interface in word processing and other text and/or graphic orientated programs. Anti-aliasing is a technique well known to those of skill in the art whereby the edges of an image are blurred or "softened" to reduce the visual artifacts produced by finite pixel sizes.

Due to the complexity of digital images, it is often necessary to compress the images in order to save storage space and/or minimize bandwidth when storing or transmitting the digital images. The compression/decompression process typically uses standardized algorithms well known to those of skill in the art. The algorithms for compressing and decompressing the images are known generically as COmpressor/DECompressors or "codecs".

Codecs are typically grouped into two main types; lossless and lossy. Lossless codecs, like LZ coding and GIF, preserve the image information in its exact form. While providing virtually perfect image replication capabilities, lossless codecs tend to provide less compression opportunities and require more resources, such as storage space and transmission bandwidth, to employ. On the other hand, lossy codecs, such as JPEG and vector quantization, store only an approximate representation of the image. Lossy codecs are typically formulated based on the capabilities and limitations of the human visual system to detect subtle differences in color. In other words, granularity and detail beyond that capable of being detected by the human eye are disregarded and do not survive the compression process. Since, using lossy codecs, digital information is selectively discarded, lossy codecs typically achieve much better compression than lossless codecs while still maintaining acceptable image quality.

In addition to the true multi-colored images, many anti-aliased images of only two base colors are also of great importance. However, in the prior art, two color anti aliased images were typically treated as many colored images by traditional encoding mechanisms. This is because while many anti-aliased images, such as those resulting from anti-aliasing two color text images or designs, have a low inherent information content, i.e., two base colors with shading variations thereof, the images appear to traditional encoding mechanisms as many colored images with a complexity similar to that of a natural image.

FIG. 1A shows an example of an image 100 including a stylized text letter "R" 101. The pixels making up image 100 are typically read horizontally line-by-line, left to right and top-to-bottom in a wrap around manner. Consequently, horizontal lines of pixels 1 to 20 are read from A to M in a continuous flow. As an example, horizontal line 1 is read from A to M and horizontal line 2 is read from A to M. Then horizontal line 3 is read from A to M and horizontal line 4 is read from A to M. Then horizontal line 5 is read from A to M and horizontal line 6 is read from A to M. Then horizontal line 7 is read from A to M and horizontal line 8 is read from A to M. Then horizontal line 9 is read from A to M and horizontal line 10 is read from A to M. Then horizontal line 11 is read from A to M and horizontal line 12 is read from A to M. Then horizontal line 13 is read from A to M and horizontal line 14 is read from A to M. Then horizontal line 15 is read from A to M and horizontal line 16 is read from A to M. Then horizontal line 17 is read from A to M and horizontal line 18 is read from A to M. Then horizontal line 19 is read from A to M and, finally, horizontal line 20 is read from A to M. As noted above, horizontal lines of pixels 1 to 20 are typically scanned as described above and are then read in a continuous flow of pixels for the entire image.

As described above, when a horizontal line of a text figure is read, there are typically series or runs of identical pixels. As an example, in FIG. 1A, when horizontal line 10 is read from A to M in the direction shown by arrow 105, pixels 10A, 10B and 10C make up a first run of three pixels of the first pixel color, in this example white, while pixels 10D, 10E, 10F, 10G, 10H, 10I and 10J make up a run of seven pixels of a second pixel color, in this example black, and pixels 10K, 10L and 10M make up a second run of three pixels of the first pixel color, in this example white.

In the example above, absent compression, each of the thirteen pixels 10A to 10M was treated as a new color being one of 256^3 possibilities, requiring three bytes of data per pixel. Consequently, absent some compression mechanism, thirty-nine bytes would be required to represent thirteen pixels of two colors arranged in runs, i.e., thirteen pixels times three bytes per pixel. Clearly this was an inefficient use of resources and, as noted, the cumulative effect for an actual image composed of hundreds, or thousands, of pixels is far more problematic than the simple example above indicates.

In addition, as can be seen in FIG. 1A, a similar result is obtained when reading image 100 by vertical columns of pixels, top-to-bottom in a vertical direction. In this instance, image 100 is typically read column-by-column, top-to-bottom and left to right in a wrap around manner. As an example, vertical column A is read from 1 to 20 and vertical column B is read from 1 to 20. Then vertical column C is read from 1 to 20 and vertical column D is read from 1 to 20. Then, vertical column E is read from 1 to 20 and vertical column F is read from 1 to 20. Then vertical column G is read from 1 to 20 and vertical column H is read from 1 to 20. Then, vertical column I is read from 1 to 20 and vertical column J is read from 1 to 20. Then vertical column K is read from 1 to 20 and vertical column L is read from 1 to 20. Then, finally, vertical column M is read from 1 to 20.

As with the reading of horizontal lines of pixels discussed above, when a vertical column of a text figure is read, there are also runs of identical pixels. As an example, in FIG. 1A, when vertical column E is read from 1 to 20 in the direction shown by arrow 107, pixels E1 and E2 make up a run of two pixels of a first pixel color, in this example white, while pixels E3, E4, E5, E6, E7, E8, E9, E10, E11, E12, E13, E14, E15, E16, E17 and E18 make up a run of sixteen pixels of a second pixel color, in this example black, and pixels E19 and E20 make up a second run of two pixels of the first pixel color, in this example white.

As with the horizontal example above, in the prior art, absent some compression mechanism, each of the twenty pixels E1, E2, E3, E4, E5, E6, E7, E8, E9, E10, E11, E12, E13, E14, E15, E16, E17, E18, E19 and E20 was treated as a new color being one of 256^3 possibilities, requiring three bytes of data per pixel. Consequently, even in this highly simplified, and low volume, example, absent compression, sixty bytes would be required to represent twenty pixels of two colors arranged in runs, i.e., twenty pixels times three bytes per pixel.

In addition, as shown in FIG. 1A, there can exist transition pixels between pixel runs. Transition pixels can be of more than one transition color, such as pixels 4C, 5L, 9F, 13H, 13J, and 17C versus pixels 3K, 4F, 4G, 4H, 4I, 4L, 5C, 6J, 7J, 8I, 8L, 12J, 14H, 16C, 16K, 17F and 17I in FIG. 1A, but the transition pixels typically lie on a line in RGB space connecting the two base colors and are therefore merely shades of the two base colors.

In instances where transition pixels are present, runs of these transition pixels also often occur, such as the run including 4F, 4G, 4H, 4I. However, once again, in the prior art, absent a compression mechanism, these runs were ignored and each transition pixel was also treated as a new color being one of 256^3 possibilities, requiring three bytes of data per pixel.

What is needed is a method of compressing and decompressing two-color anti aliased images so these extremely common anti-aliased images can be more efficiently compressed.

SUMMARY OF THE INVENTION

The present invention provides a method to compress and decompress two color anti-aliased images.

According to the present invention, two color anti-aliased images are first detected. Once two color anti-aliased images are detected, according to the present invention, a factor of three in compression is immediately achieved by using a single eight bit, one byte, value to represent the position of a pixel color along the line in color space connecting the two base colors, e.g., for the case R=G=B, it is enough to specify R. The present invention then takes advantage of the fact that with two color anti-aliased images, the two base colors often appear in adjacent or continuous series or "runs" of pixels representing the same color, this is particularly true for text images. According to one embodiment to the present invention, these runs are identified and then encoded to produce increased compression efficiency.

For instance, according to the present invention, for each pixel run a first field is used to indicate the base color and a second field indicates the length of the run. Recall from the discussion above regarding FIG. 1A, when horizontal line 10 of image 100 is read from A to M in the direction shown by arrow 105, only two colors are present and those colors appear in three distinct runs. However, as discussed above, in the prior art, absent compression, each of the thirteen pixels 10A to 10M was treated as a new color being one of 256^3 possibilities, requiring three bytes of data per pixel.

In contrast, using the method of the present invention, a first field would identify the base color of pixels 10A, 10B and 10C as white and a second field would identify the run as a three-pixel run. Likewise, a first field would identify the base color of pixels 10D, 10E, 10F, 10G, 10H, 10I and 10J as black and a second field would identify the run as a seven-pixel run. Likewise, a first field would identify the base color of pixels 10K, 10L and 10M as white and a second field would identify the run as a three-pixel run. Consequently, while, absent compression, the prior art would require thirty nine bytes to relay the information represented by pixels 10A to 10M in FIG. 1A, using the present invention, as few as twelve bytes would be required, three bytes per pixel run to identify the color and one byte per pixel run to relay the run length information.

Those of skill in the art will readily recognize that a similar result is obtained using the method of the present invention when reading image 100 by vertical columns top-to-bottom in the direction shown by arrow 107. Indeed, simulations run by the Inventors of the present invention indicate that even greater compression can be achieved, in certain cases, when using the present invention and reading image 100 top-to-bottom in a vertical direction.

It is to be understood that both the foregoing general description and following detailed description are intended only to exemplify and explain the invention as claimed.

BRIEF DESCRIPTION OF THE DRAWINGS

The accompanying drawings, which are incorporated in, and constitute a part of, this specification illustrate embodiments of the invention and, together with the description, serve to explain the advantages and principles of the invention. In the drawings.

DETAILED DESCRIPTION

The invention will now be described in reference to the accompanying drawings. The same or similar reference numbers may be used throughout the drawings and the following description to refer to the same or like parts.

The present invention takes advantage of the fact that when two color anti-aliased images are present, it is often the case that the two base colors appear in adjacent or continuous series or "runs" of pixels representing the same color. According to one embodiment to the present invention, these runs are identified and then encoded to produce increased compression efficiency.

Figure 2:
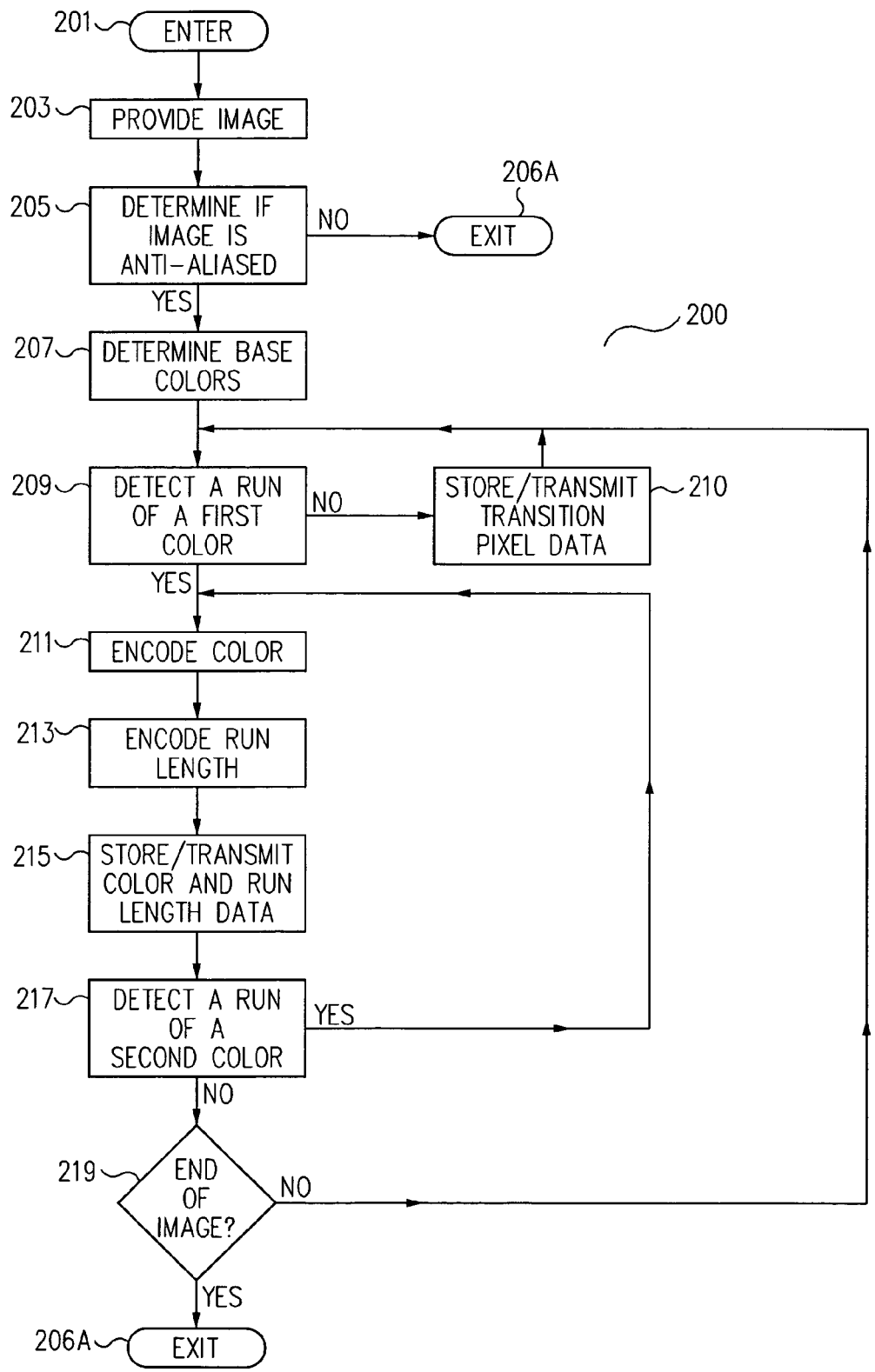
FIG. 2 shows a flow chart of one embodiment of a method for compressing two color anti-aliased source images in accordance with the principles of the invention.

Referring briefly to FIG. 2, in one embodiment of a method to compress two color anti-aliased images of the invention, an image to be compressed is provided (PROVIDE IMAGE OPERATION 203 in FIG. 2). A determination is then made as to whether the image is a two-color anti-aliased image (DETERMINE IF IMAGE IS ANTI-ALIASED OPERATION 205 in FIG. 2). According to one embodiment of the method of the present invention, if it is determined at that the image provided is a two-color anti-aliased image the two base colors are determined (DETERMINE BASE COLORS OPERATION 207 in FIG. 2).

According to one embodiment of the method of the present invention an attempt is made to detect a series or "run" of multiple pixels of one of the two colors (DETECT A RUN OF A FIRST COLOR OPERATION 209 in FIG. 2). If a run of multiple pixels of either color is detected then, according to one embodiment of the method of the present invention, the color value is encoded (ENCODE COLOR OPERATION 211 in FIG. 2) and the run length is encoded (ENCODE RUN LENGTH OPERATION 213 in FIG. 2).

According to one embodiment of the present invention, once the color and run length are encoded, the encoded color and run length information is either stored or transmitted (STORE/TRANSMIT COLOR AND RUN LENGTH DATA OPERATION 215 in FIG. 2) and the method then attempts to detect a second run of multiple pixels of one of the two colors (DETECT A RUN OF A SECOND COLOR OPERATION 217 in FIG. 2). If a second run is found, the process is repeated until all runs of the image are detected and encoded.

As discussed above, a method for selecting/detecting two color anti-aliased images from a set of miscellaneous images is described in commonly assigned U.S. patent application Ser. No. 10/892,614 entitled "DETECTION OF ANTI-ALIASING IN TWO-COLOR IMAGES FOR IMPROVED COMPRESSION", filed Jul. 15, 2004 in the name of inventors Thomas G. O'Neill and Richard G. Fell, which is incorporated herein, in its entirety, by reference.

Using the method of commonly assigned U.S. patent application Ser. No. 10/892,614, an anti-aliased image is detected by the fact that all of the color values of the image lie on a single line in three-dimensional color space. The line in three-dimensional color space connects the points for the two source/base colors. This line is considered the base color line and the end points are considered the two base colors. For simplicity, in the discussion below, we will focus on the case where the color space is RGB. However, those of skill in the art will readily recognize that the method of the commonly assigned U.S. patent application Ser. No. 10/892,614, and the method of the present invention, can easily be applied in any color space, e.g. YUV or YCbCr.

Figure 1A:
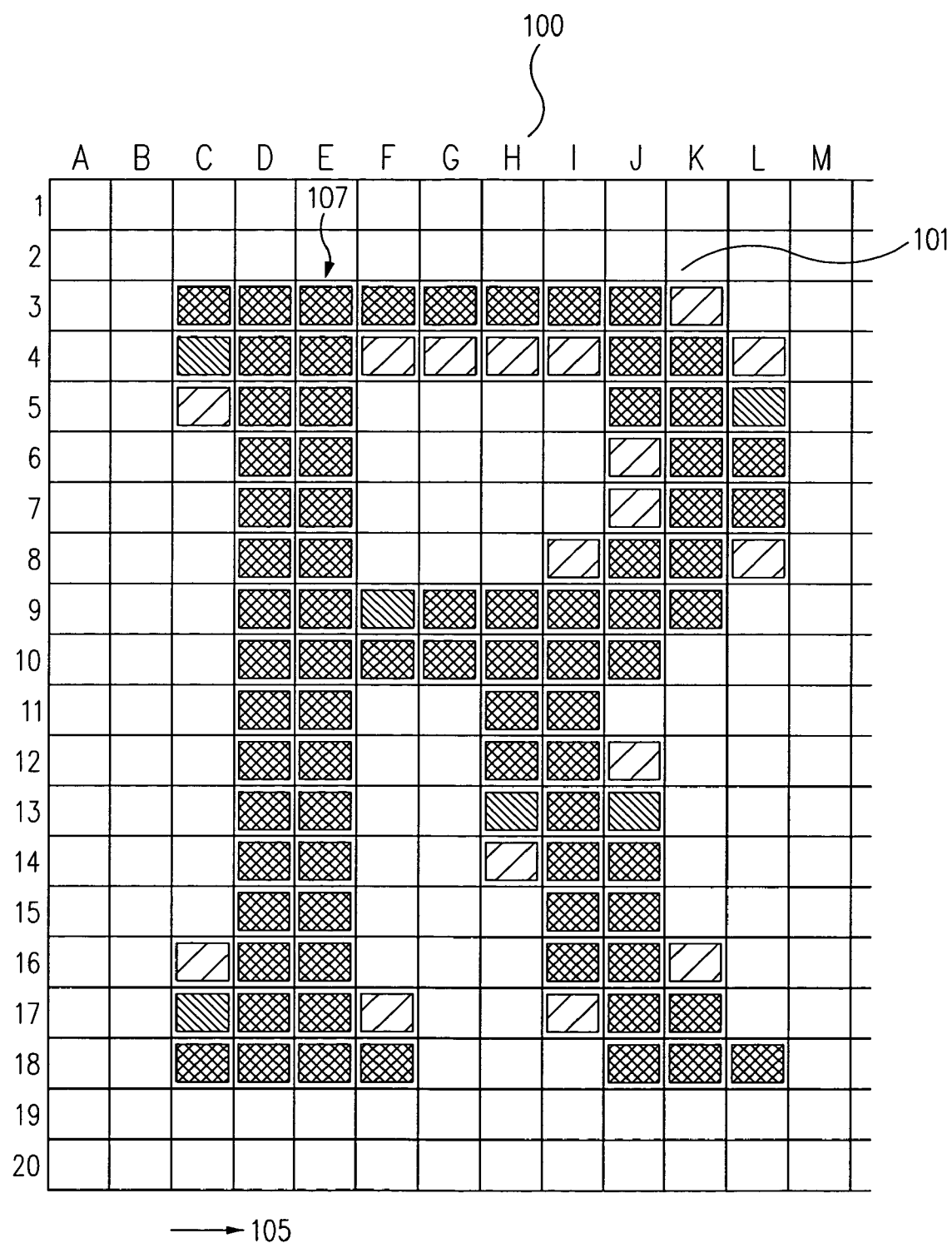
FIG. 1A shows an exemplary image including a text letter.
Figure 1B:
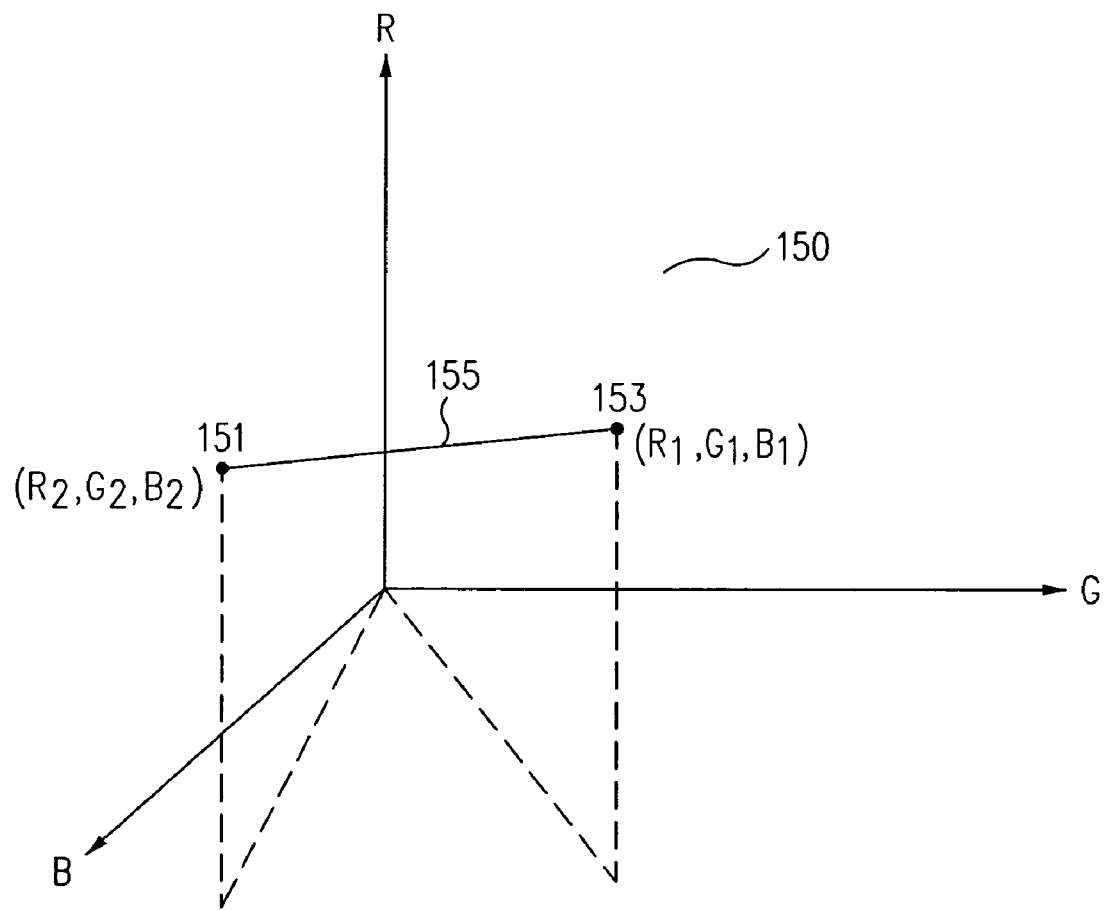
FIG. 1B is a graphical representation of the fact that a two color anti-aliased image can be detected by all of the color values of the image lying on a single line in three-dimensional color space.

FIG. 1B is a graphical representation of the fact that a two color anti-aliased image can be detected by the instance where all of the color values of the image lie on a single line 155 in three-dimensional color space 150. For a two-color source image such as text, the averaging used in many anti-aliasing techniques ensures that the destination pixel values are interpolations of the two source colors 151 and 153 having RGB space coordinates R1, G1, B1 and R2, G2, B2, respectively. Using the one embodiment of the method of the present invention, such an anti-aliased image is detected by the fact that all of the color values of the image lie on line 155 in three-dimensional color space 150. As noted above, for simplicity, in the discussion below, we will focus on the case where color space 150 is RGB color space. However, those of skill in the art will readily recognize that the method of the present invention can easily be applied in any color space, e.g. YUV or YCbCr.

One embodiment of the invention described in U.S. patent application Ser. No. 10/892,614 is used with grayscale images, i.e., those generated by anti-aliasing a black and white source image. As discussed in more detail below, for these images, each pixel satisfies the condition R=G=B. However, one of ordinary skill could easily generalize the techniques described in U.S. patent application Ser. No. 10/892,614 to apply to anti-aliased images of any two-source colors. For simplicity, we will refer herein to an anti-aliased image with two source colors as a two-color anti-aliased image. For a two-color anti-aliased image, such as simple text, there are minimum and maximum values that will typically correspond to the two source colors.

FIG. 2 shows a flow chart of one embodiment of a method 200 to compress two color anti-aliased images. The method begins at ENTER OPERATION 201 and proceeds to PROVIDE IMAGE OPERATION 203 where an image to be compressed is provided.

At DETERMINE IF IMAGE IS ANTI-ALIASED OPERATION 205 a determination is made as to whether the image is a two-color anti-aliased image. As noted above, a method for selecting/detecting two color anti-aliased images from a set of miscellaneous images is described in commonly assigned U.S. patent application Ser. No. 10/892,614 entitled "DETECTION OF ANTI-ALIASING IN TWO-COLOR IMAGES FOR IMPROVED COMPRESSION", filed Jul. 15, 2004 in the name of inventors Thomas G. O'Neill and Richard G. Fell, which is incorporated herein, in its entirety, by reference.

If, at DETERMINE IF IMAGE IS ANTI-ALIASED OPERATION 205, it is determined that the image provided at PROVIDE IMAGE OPERATION 203 is a not a two-color anti-aliased image, method 200 is exited at EXIT OPERATION 206A.

If, on the other hand, it is determined at DETERMINE IF IMAGE IS ANTI-ALIASED OPERATION 205 that the image provided at PROVIDE IMAGE OPERATION 203 is a two-color anti-aliased image, flow proceeds to DETERMINE BASE COLORS OPERATION 207 where the two base colors are determined by scanning the entire image. As noted above, according to the present invention, once two-color anti-aliased images are detected, a factor of three in compression is immediately achieved by using a single eight bit, one byte, value to represent the position along the line in color space, e.g., for the case R=G=B, it is enough to specify R.

At DETECT A RUN OF A FIRST COLOR OPERATION 209, the method attempts to detect a series or "run" of multiple pixels of one of the colors from DETERMINE BASE COLORS OPERATION 207. If no run of multiple pixels of either color is detected, flow moves on to STORE/TRANSMIT PIXEL DATA OPERATION 210 where it is assumed the present pixel is a transition pixel and the transition pixel data is transmitted and/or stored and the method then advances to the next pixel. If, on the other hand, a run of multiple pixels of either color is detected, then flow proceeds to ENCODE COLOR OPERATION 211, where the color value is encoded, and then to ENCODE RUN LENGTH OPERATION 213, where the run length is encoded and the method then advances to the next pixel.

For instance, according to the present invention, a first field of a pixel run coding scheme indicates the base color as encoded at ENCODE COLOR OPERATION 211 and a second field of a pixel run coding scheme identifies the length of the run as encoded at ENCODE RUN LENGTH OPERATION 213. Referring again to the example of FIG. 1A, and viewing FIG. 1A and FIG. 2 together, a first field encoded at ENCODE COLOR OPERATION 211 would identify the base color of pixels 10A, 10B and 10C as white and a second field encoded at ENCODE RUN LENGTH OPERATION 213 would identify the run as a three pixel run.

Likewise, a similar result is obtained when reading image 100 in a vertical direction along column E. In this instance, E1 and E2, a run of two white pixels is encoded at ENCODE COLOR OPERATION 211 and ENCODE RUN LENGTH OPERATION 213.

As shown above, in the one specific embodiment of the invention, where the base colors are black and white, the black and white pixels tend to occur in many-pixel runs. In order to take advantage of this fact, in one embodiment of the invention, any occurrence of black pixels (R, G, B=0, 0, 0) or white pixels (R, G, B=255, 255, 255) is followed by a field specifying the length of the run at ENCODE RUN LENGTH OPERATION 213. This field may have a fixed or variable width.

In one embodiment of the invention, variable-width fields encoded at ENCODE RUN LENGTH OPERATION 213 would typically result from entropy-coding the run length at ENCODE RUN LENGTH OPERATION 213. According to the one embodiment of the present invention, when the field has a fixed-width, the size of fixed-width field is pre-determined based on the height and width of the image (not shown in FIG. 2 but see 306 FIG. 3 as an example). According to another embodiment of the present invention, when the field encoded at ENCODE RUN LENGTH OPERATION 213 has a fixed-width, the size of fixed-width field is determined from the distribution of run lengths in order to yield the best compression. According to one embodiment of the present invention, pixel runs longer than the fixed field width encoded at ENCODE RUN LENGTH OPERATION 213 are reported as multiple pixel runs of the same color at DETECT A RUN OF A SECOND COLOR OPERATION 217.

In one embodiment of the present invention, colors other than black and white are reported using eight bits per pixel. In one embodiment of the present invention, runs of any repeating gray pixels can be compressed in a manner similar to the black and white runs. In this instance, according to one embodiment of the invention, a special flag value (not shown in FIG. 2) in one or more bits following such a color is used to indicate that the gray pixel is the start of a run.

In one embodiment of the present invention, the eight bit, one byte, color value is not necessarily specified for each run or non-run pixel at ENCODE COLOR OPERATION 211. In this embodiment, special codes (not shown in FIG. 2) are used at ENCODE COLOR OPERATION 211 to specify in which class the next pixel belongs. In one embodiment of the invention, two bits may be used at ENCODE COLOR OPERATION 211 to specify which class the next pixel belongs to as follows:

00: a run of black;
01: a run of white;
10: a run of gray; and
11: a gray value that occurs only once.

In one embodiment of the invention, the values 10 and 11 discussed above are accompanied by a color value from ENCODE COLOR OPERATION 211. Values 00, 01, and 10 are accompanied by a fixed or variable width run length field at ENCODE RUN LENGTH OPERATION 213.

As discussed above, in one embodiment of the invention, the pixel values are specified in contiguous columns, i.e., vertical columns A to M in FIG. 1A rather than in contiguous rows 1 to 20 in FIG. 1A.

According to one embodiment of the present invention, once the color and run length are encoded at ENCODE COLOR OPERATION 211 and ENCODE RUN LENGTH OPERATION 213, respectively, the encoded color and run length information is either stored or transmitted at STORE/TRANSMIT COLOR AND RUN LENGTH DATA OPERATION 215 and the method proceeds to DETECT A RUN OF A SECOND COLOR OPERATION 217.

At DETECT A RUN OF A SECOND COLOR OPERATION 217, method 200 attempts to detect a second run of multiple pixels. If a second run is found, the process returns to ENCODE COLOR OPERATION 211 and the procedures of ENCODE COLOR OPERATION 211, ENCODE RUN LENGTH OPERATION 213, STORE/TRANSMIT COLOR AND RUN LENGTH DATA OPERATION 215 and DETECT A RUN OF A SECOND COLOR OPERATION 217 are repeated. For instance, returning to FIG. 1A and viewing FIG. 1A together with FIG. 2, the seven pixel run of pixels 10D to 10J is detected and encoded at ENCODE COLOR OPERATION 211 as being of the second color and at ENCODE RUN LENGTH OPERATION 213 as having a seven pixel length.

The process at DETECT A RUN OF A SECOND COLOR OPERATION 217 is repeated until all runs of the image are detected and encoded. For instance, returning to FIG. 1A and viewing FIG. 1A together with FIG. 2, the run in FIG. 1A represented by pixels 10K to 10M is encoded as being of the first color at ENCODE COLOR OPERATION 211 and having a run length of three at ENCODE RUN LENGTH OPERATION 213.

If no new run of pixels of either of the two colors is detected at DETECT A RUN OF A SECOND COLOR OPERATION 217, flow moves to END OF IMAGE? OPERATION 219 where a determination is made as to whether the image end has been reached. If it is the end of the image, method 200 exits at EXIT OPERATION 206A. If it is not the end of the image, method 200 returns to DETECT A RUN OF A FIRST COLOR OPERATION 209 where method 200 again attempts to detect a run of multiple pixels of one of the two colors from DETERMINE BASE COLORS OPERATION 207.

As discussed above, according to one embodiment of the present invention, a first field of a pixel run coding scheme is used to indicate the base color at ENCODE COLOR OPERATION 211 and a second field of a pixel run coding scheme indicates the length of the run at ENCODE RUN LENGTH OPERATION 213. Recall from the discussion above regarding FIG. 1A, when horizontal line 10 of image 100 is read from A to M in the direction shown by arrow 105, pixels 10A, 10B, and 10C make up a run of three pixels of a first pixel color, in this example white, while pixels 10D to 10J make up a run of seven pixels of a second pixel color, in this example black, and pixels 10K, 10L and 10M make up a second run of three pixels of the first pixel color, in this example white.

In the example above, only two colors are present and those colors appear in three distinct runs.

However, as discussed above, in the prior art, absent compression, each of the thirteen pixels was treated as a new color being one of 256^3 possibilities, requiring three bytes of data per pixel. Consequently, thirty-nine bytes would be required to represent thirteen pixels of two colors arranged in runs using prior art methods.

In contrast, using the one embodiment of the invention discussed with respect to FIG. 2 above, a first field would identify the base color of pixels 10A, 10B, and 10C in FIG. 1A as white and a second field would identify the run as a three-pixel run. Likewise, a first field would identify the base color of pixels 10D, 10E, 10F, 10G, 10H, 10I, and 10J as black and a second field would identify the run as a seven-pixel run. Likewise, a first field would identify the base color of pixels 10K, 10L, and 10M as white and a second field would identify the run as a three-pixel run. Consequently, using one embodiment of method 200 of FIG. 2, as few as twelve bytes encoded at ENCODE COLOR OPERATION 211 and ENCODE RUN LENGTH OPERATION 213 would be required for lossless compression, three bytes per pixel run to identify the color and one byte per pixel run to relay the run length information.

As shown above, even in the highly simplified example of FIG. 1A, using one embodiment of method 200 of FIG. 2, as few as twelve bytes would be required to relay the information associated with horizontal line 10 in FIG. 1A, while the prior art would have required thirty-nine bytes to relay the same information. Therefore, only thirty percent of the prior art bytes are required to convey the same information using the present invention.

In addition, the savings in terms of bytes required to relay the same information is even more impressive when it is considered that, as discussed above, image 100 is typically read line-by-line, left to right and top-to-bottom in a wrap around manner so that horizontal lines 1 to 20 are read from A to M in a continuous flow. In this case, the entire image 100 becomes a single stream of pixel runs and, as is true of most two color images, and particularly true of text images, many of the runs are of significant length and therefore present significant opportunities to take advantage of the byte savings of the present invention.

For instance, as image 100 is read from left to right in a wraparound manner, pixels 1A to 1M, 2A to 2M and 3A and 3B are encoded at ENCODE COLOR OPERATION 211 and ENCODE RUN LENGTH OPERATION 213 as a single run of twenty-eight pixels of a first color, in this example white. Using the method of the invention, this run of twenty-eight pixels is represented by as few as four bytes, three bytes to identify the color and one byte to relay the run length information. In contrast, the prior art would have required eighty-four bytes to represent the same pixels. A similarly impressive result would be had for the portion of image 100 including horizontal rows 18, 19 and 20. Since two color images, and text images in particular, often include these long pixel runs, the present invention is particularly advantageous in these instances.

Those of skill in the art will readily recognize that a similar result is obtained using one embodiment of method 200 of FIG. 2 when reading image 100 top-to-bottom in the direction shown by arrow 107 in FIG. 1A. Indeed, simulations run by the Inventors of the present invention indicate that even greater compression can be achieved, in certain cases, when using the present invention and reading image 100 in vertical columns top-to-bottom in a vertical direction.

For instance, when vertical column E is read from 1 to 20 in the direction shown by arrow 107, pixels E1 and E2 make up a run of two pixels of a first pixel color, in this example white, while pixels E3 to E18 make up a run of sixteen pixels of a second pixel color, in this example black, and pixels E19 and E20 make up a second run of two pixels of the first pixel color, in this example white.

As with the horizontal example above, in the vertical example, only two colors are present and those colors appear in three distinct runs. However, as discussed above, in the prior art, absent compression, each of the twenty pixels E1 to E20 was treated as a new color being one of 256^3 possibilities, requiring three bytes of data per pixel. Consequently, sixty bytes would be required to relay the information.

In contrast, using one embodiment of method 200 of FIG. 2, a first field would identify the base color of pixels E1 and E2 as white and a second field would identify the run as a two-pixel run. Likewise, a first field would identify the base color of pixels E3 to E18 as black and a second field would identify the run as a sixteen-pixel run. Likewise, a first field would identify the base color of pixels E19 and E20 as white and a second field would identify the run as a two-pixel run. Consequently, while the prior art would require sixty bytes to relay the run represented by pixels E1 to E20 in FIG. 1A, using one embodiment of method 200 of FIG. 2, as few as twelve bytes encoded at ENCODE COLOR OPERATION 211 and ENCODE RUN LENGTH OPERATION 213 would be required, three bytes per pixel run to identify the color and one byte per pixel run to relay the run length information.

As shown above, using one embodiment of method 200 of FIG. 2, as few as twelve bytes would be required to relay the information associated with vertical column E in FIG. 1A, while the prior art would have required sixty bytes to relay the same information. Therefore, only twenty percent of the prior art bytes are required to convey the same information.

In addition, as discussed above with respect to horizontal rows, the savings in terms of bytes required to relay the same information is even more impressive when it is considered that image 100 is typically read vertically, column by column, top to bottom and left to right in a wrap around manner so that vertical columns A to M are read from 1 to 20 in a continuous flow. In this case, the entire image 100 becomes a single stream of pixel runs and, as is true of most two color images, and particularly true of text images, many of the runs are of significant length and therefore present significant opportunities to take advantage of the byte savings of the present invention.

For instance, as image 100 is read from top to bottom in a wraparound manner, pixels A1 to A20, B1 to B20 and C1 and C2 become a single run of forty-two pixels of a first color, in this example white. Using the method of the invention this run of forty-two pixels is encoded at ENCODE COLOR OPERATION 211 and ENCODE RUN LENGTH OPERATION 213 and represented by as few as four bytes, three bytes to identify the color and one byte to relay the run length information. In contrast, the prior art would have required one hundred and twenty-six bytes to relay the same information. A similarly impressive result would be had for the portion of image 100 including vertical columns K, L, and M. As discussed above, since two color images, and text images in particular, often include these long pixel runs, the present invention is particularly advantageous in these instances.

As noted above, a vertical column scan of text images has been found empirically by the inventor to be particularly efficient because of the long runs of background color pixels between each letter in a word and between words.

In one embodiment of the invention, the repeated pixels of the base colors, for instance black and white, are compressed losslessly and the transition pixels, for instance gray color pixels between black and white, are compressed using a lossy technique. In this embodiment, a transition can also be defined by any number of non-black and non-white pixels between two runs. In this embodiment of the invention, the image colors are divided into a few, typically 16 or less, ranges of equal size. According to one embodiment of the present invention, the color ranges are represented by a few bits, for example, two bits for four color ranges.

In one embodiment of the present invention, the equal-size ranges are only used to encode small groups, for example one or two, of transition pixels. Larger groups of transition pixels can be encoded as just the number of transition pixels. In this case, a decoder can determine approximate pixel values by assuming a linear transition between the end of the previous run and the start of the next one.

In one embodiment of the present invention, the larger groups of transition pixels may also be represented by encoding the number of pixels plus a few bits that reference a particular transition shape in a small, typically eight entries or less, catalog of possible shapes.

In one embodiment of the present invention, an encoder may detect changes in direction of the transition pixels along the line in RGB space. That is, according to this embodiment of the invention, groups of transition pixels are divided into smaller sets whose pixel values vary monotonically.

In one embodiment of the present invention, any transition pixels of a color value within ten percent of the value of the base two colors, for instance, black or white, are changes to be black or white, respectively. The size of the transition color ranges is also re-calculated to maintain an equal number of colors in each color range. Of course, values other than ten percent can be used and the values for the two base colors need not be identical.

In one embodiment of the present invention, the role of the equal-size ranges is played by an arbitrary deterministically determined set of ranges, i.e., the ranges can grow exponentially with increasing pixel value, so long as the encoder and decoder agree on the number and size of color ranges.

Figure 3:
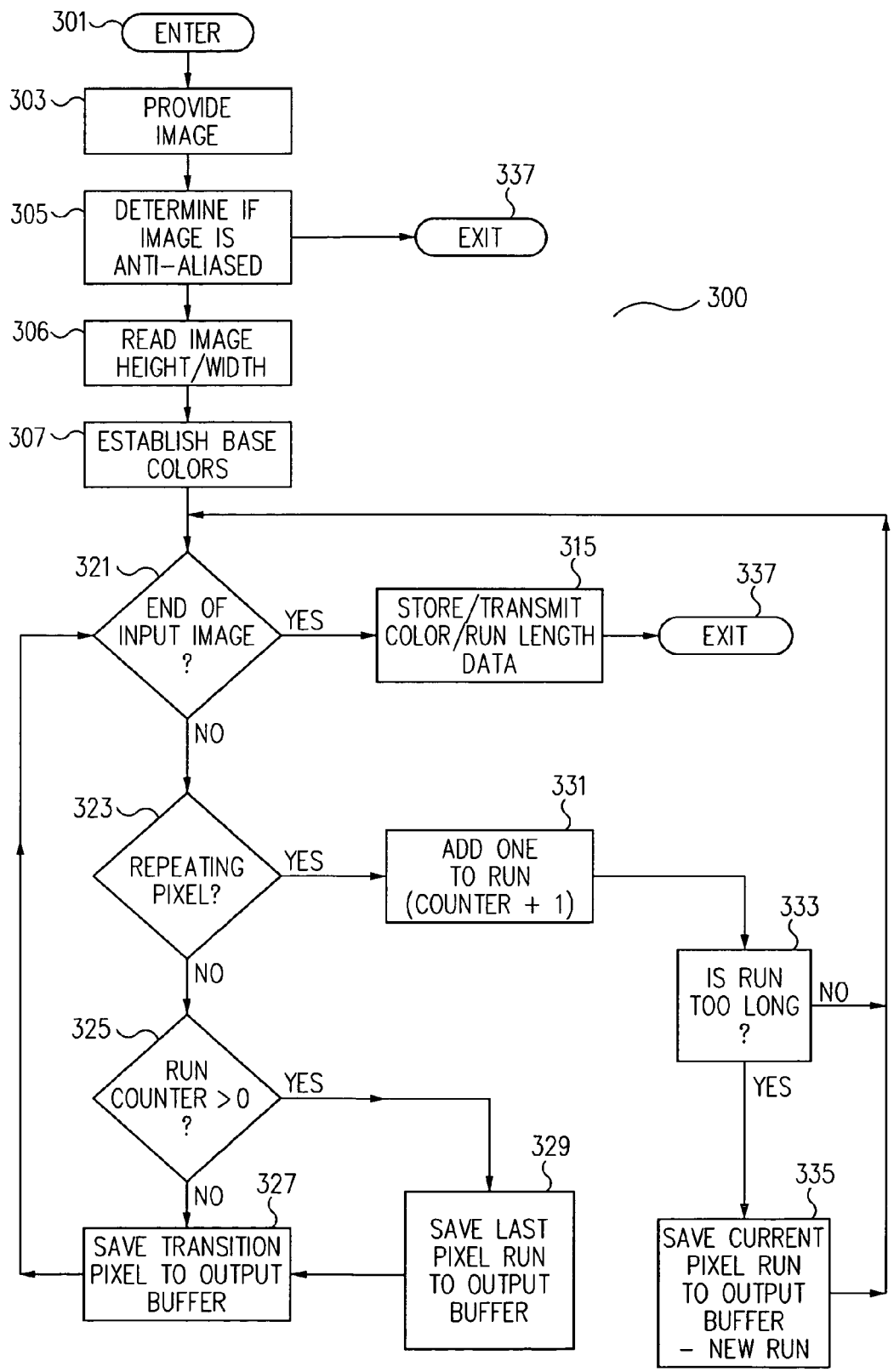
FIG. 3 shows a flow chart of one embodiment of a method for lossless encoding of two color anti-aliased source images in accordance with the principles of the invention.

FIG. 3 shows a flow chart of one embodiment of a method 300 for lossless encoding of two color anti-aliased source images in accordance with the principles of the invention. The method begins at ENTER OPERATION 301 and proceeds to PROVIDE IMAGE OPERATION 303 where an image to be compressed is provided.

At DETERMINE IF IMAGE IS ANTI-ALIASED OPERATION 305 a determination is made as to whether the image is a two-color anti-aliased image. As noted above, a method for selecting/detecting two color anti-aliased images from a set of miscellaneous images is described in commonly assigned U.S. patent application Ser. No. 10/892,614 entitled "DETECTION OF ANTI-ALIASING IN TWO-COLOR IMAGES FOR IMPROVED COMPRESSION", filed Jul. 15, 2004 in the name of inventors Thomas G. O'Neill and Richard G. Fell, which is incorporated herein, in its entirety, by reference.

If, at DETERMINE IF IMAGE IS ANTI-ALIASED OPERATION 305, it is determined that the image provided at PROVIDE IMAGE OPERATION 303 is a not a two-color anti-aliased image, method 300 is exited at EXIT OPERATION 337. If, on the other hand, it is determined at DETERMINE IF IMAGE IS ANTI-ALIASED OPERATION 305 that the image provided at PROVIDE IMAGE OPERATION 303 is a two-color anti-aliased image, flow proceeds to READ IMAGE HEIGHT/WIDTH OPERATION 306 where the image height and width information is read from the image header. At ESTABLISH BASE COLORS OPERATION 307 the entire image is scanned to determine the two base colors. Those of skill in the art will readily recognize that READ IMAGE HEIGHT/WIDTH OPERATION 306 and ESTABLISH BASE COLORS OPERATION 307 can easily be combined into a single operation.

As noted above, according to the present invention, once two-color anti-aliased images are detected, a factor of three in compression is immediately achieved by using a single eight bit, one byte, value to represent the position along the line in color space, e.g., for the case R=G=B, it is enough to specify R.

At END OF IMAGE? OPERATION 321 a determination is made as to whether the present pixel is the end of the image. If the present pixel is the end of the image, flow proceeds to STORE/TRANSMIT COLOR/RUN DATA OPERATION 315 where a buffer containing the color information and the run length data for the entire image is stored and/or transmitted. Method 300 is then exited at EXIT OPERATION 337. If, on the other hand, the present pixel is not the end of the image, flow proceeds to REPEATING PIXEL? OPERATION 323.

At REPEATING PIXEL? OPERATION 323 a determination is made as to whether the present pixel is a repeating pixel, i.e., is part of the current single-color run of pixels. If the present pixel is a repeating pixel, then a run length counter is incremented by one at ADD ONE TO RUN COUNTER OPERATION 331. Once the run length counter is incremented by one at ADD ONE TO RUN COUNTER OPERATION 331, flow proceeds to IS RUN TOO LONG? OPERATION 333 where a determination is made as to whether the present run is too long, i.e., exceeds the fixed run length. If the present run is too long, then the current pixel run is saved to an output buffer and the present pixel is treated as the first pixel of a new run. Method 300 then returns to END OF IMAGE? OPERATION 321. If, on the other hand, the present run is not too long, method 300 returns directly to END OF IMAGE? OPERATION 321 without saving to the output buffer.

Returning to REPEATING PIXEL? OPERATION 323, if the present pixel is not a repeating pixel, then flow proceeds to RUN COUNTER GREATER THAN ZERO? OPERATION 325 where a determination is made as to whether the run counter has a value greater than zero, i.e., a run has already been started. If the run counter has a value greater than zero, flow proceeds to SAVE LAST PIXEL RUN TO OUTPUT BUFFER OPERATION 329 where the last pixel run is saved to the output buffer, ending at the previous pixel. The current pixel is then considered either a transition pixel or the beginning of a new pixel run. Method 300 then proceeds to SAVE TRANSITION PIXEL TO OUTPUT BUFFER OPERATION 327. If the run counter does not have a value greater than zero, flow proceeds directly to SAVE TRANSITION PIXEL TO OUTPUT BUFFER OPERATION 327.

At SAVE TRANSITION PIXEL TO OUTPUT BUFFER OPERATION 327, the present pixel is assumed to be a transition pixel and is saved to the output buffer. Method 300 then proceeds back to END OF IMAGE? OPERATION 321. Flow proceeds, repeatedly, as described above until at END OF IMAGE? OPERATION 321 it is determined that the present pixel is the end of the image. Then flow proceeds to STORE/TRANSMIT COLOR/RUN DATA OPERATION 315 where the color information and the run length data for the entire image is stored and/or transmitted and method 300 is exited at EXIT OPERATION 337.

Figure 4:
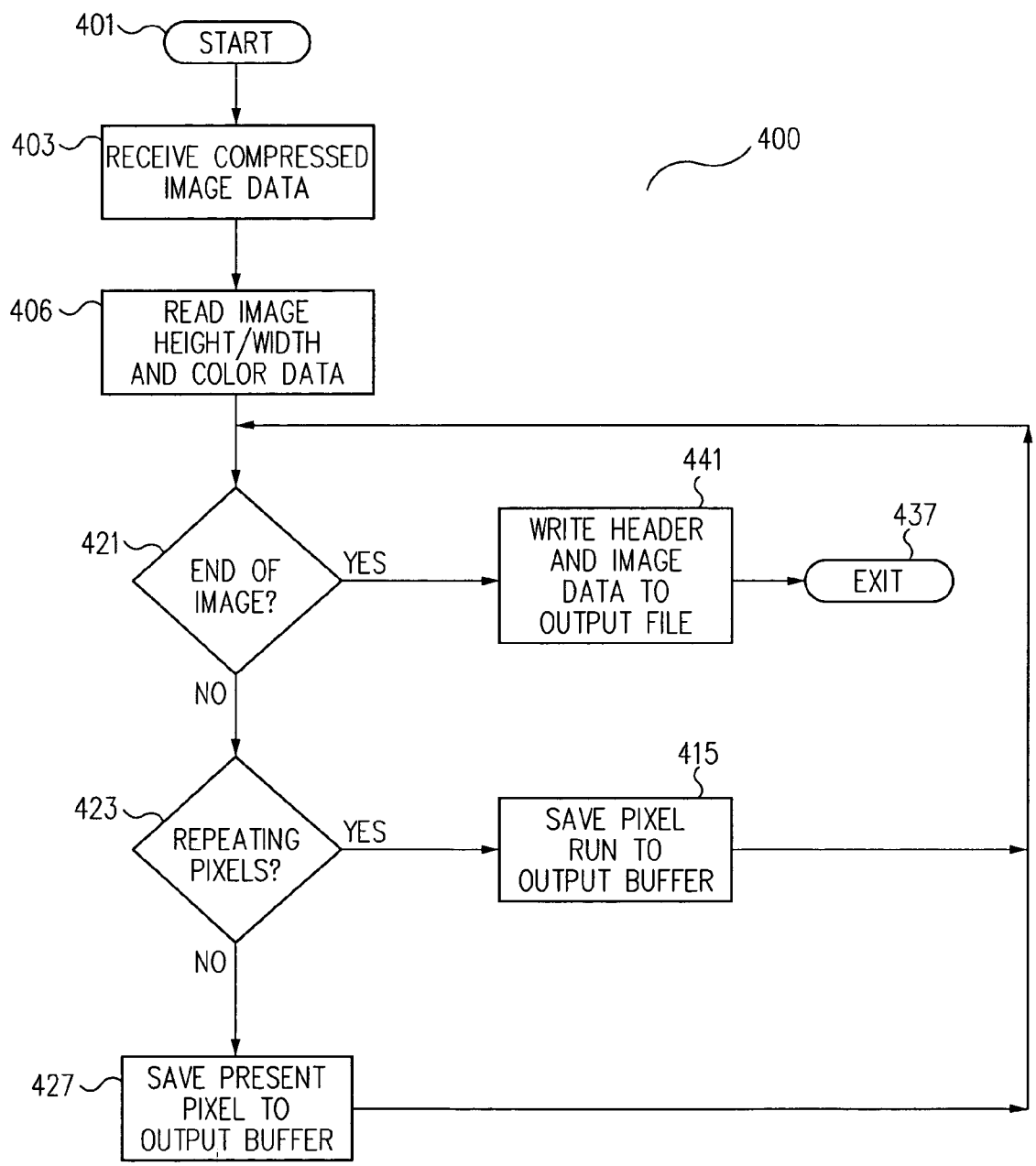
FIG. 4 shows a flow chart of one embodiment of a method for lossless decoding of two color anti-aliased source images in accordance with the principles of the invention.

FIG. 4 shows a flow chart of one embodiment of a method 400 for lossless decoding of two color anti-aliased source images in accordance with the principles of the invention. Method 400 starts at ENTER OPERATION 401 and proceeds to RECEIVE COMPRESSED IMAGE DATA OPERATION 403 where a compressed image header, typically compressed by one embodiment of the invention such as method 300 in FIG. 3, is received. At READ IMAGE HEIGHT/WIDTH AND COLOR DATA OPERATION 406 in FIG. 4, the height and width information for the image is read from the image header.

At END OF IMAGE? OPERATION 421 a determination is made as to whether or not the present data is the end of the image. If it is determined at END OF IMAGE? OPERATION 421 that the present data is the end of the image, then at WRITE HEADER AND IMAGE DATA TO OUTPUT FILE OPERATION 441 the image header and image data is written to an output file and method 400 is exited at EXIT OPERATION 437. If, on the other hand, it is determined at END OF IMAGE? OPERATION 421 that the present data is not the end of the image, a determination is made as to whether the present data represents a run of repeating pixels at REPEATING PIXEL? OPERATION 423.

If it is determined at REPEATING PIXELS? OPERATION 423 that the present data does not represent a run of repeating pixels, then flow proceeds to SAVE PRESENT PIXEL TO OUTPUT BUFFER OPERATION 427 where the pixel represented by the present data is saved to an output buffer. Method 400 then returns to END OF IMAGE? OPERATION 421. If, on the other hand, it is determined at REPEATING PIXELS? OPERATION 423 that the present data represents a run of repeating pixels, then flow proceeds to SAVE PIXEL RUN TO OUTPUT BUFFER OPERATION 415 where the present pixel run represented by the present data is saved to an output buffer. Method 400 then returns to END OF IMAGE? OPERATION 421.

Flow proceeds as described above, repeatedly, until it is determined at END OF IMAGE? OPERATION 421 that the present data is the end of the image, then at WRITE HEADER AND IMAGE DATA TO OUTPUT FILE OPERATION 441 the image header and image data is written to an output file and method 400 is exited at EXIT OPERATION 437.

Figure 5:
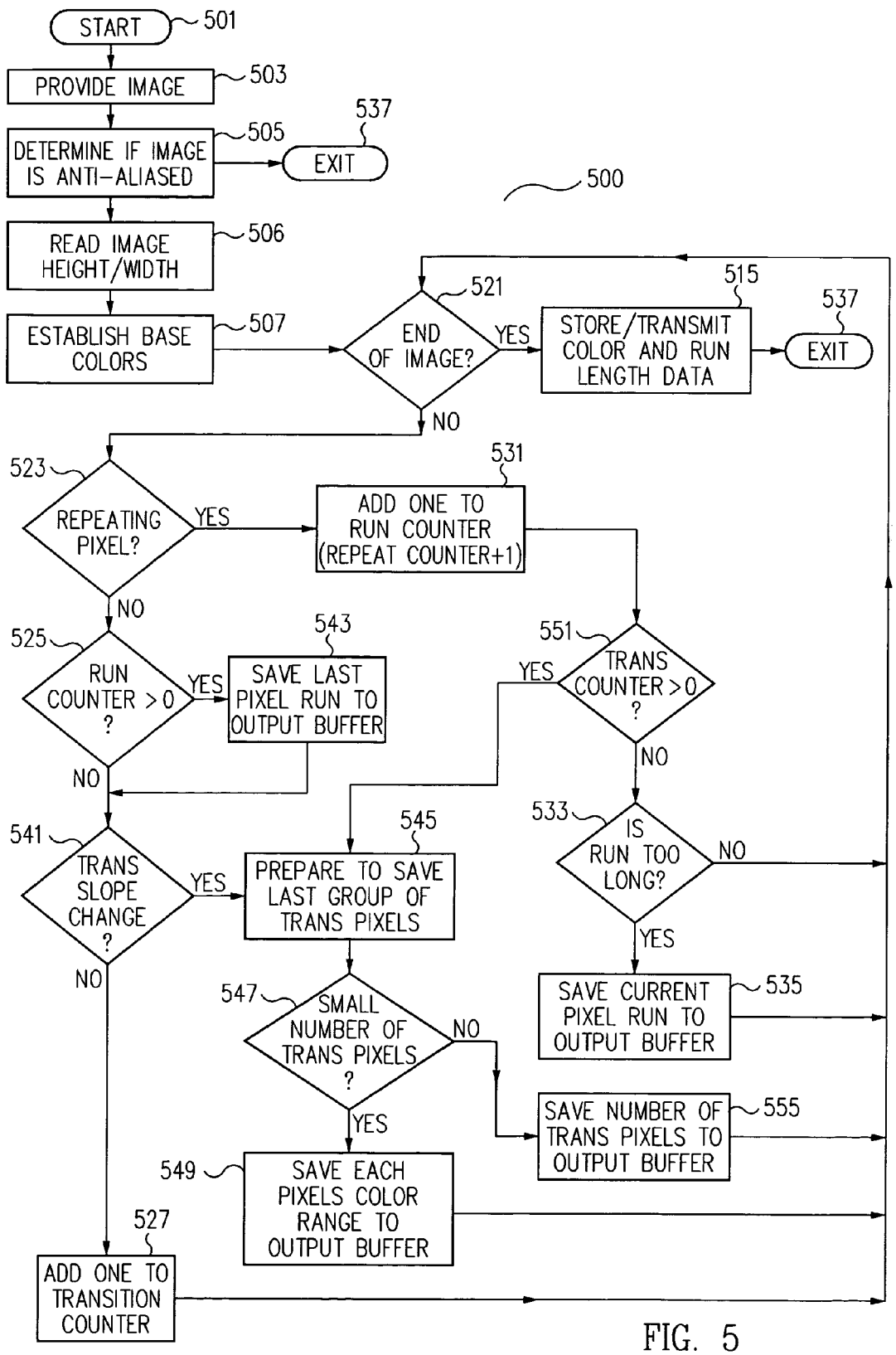
FIG. 5 shows a flow chart of one embodiment of a method for lossy encoding of two color anti-aliased source images in accordance with the principles of the invention.

FIG. 5 shows a flow chart of one embodiment of a method 500 for lossy encoding of two color anti-aliased source images in accordance with the principles of the invention. The method begins at ENTER OPERATION 501 and proceeds to PROVIDE IMAGE OPERATION 503 where an image to be compressed is provided.

At DETERMINE IF IMAGE IS ANTI-ALIASED OPERATION 505 a determination is made as to whether the image is a two-color anti-aliased image. As noted above, a method for selecting/detecting two color anti-aliased images from a set of miscellaneous images is described in commonly assigned U.S. patent application Ser. No. 10/892,614 entitled "DETECTION OF ANTI-ALIASING IN TWO-COLOR IMAGES FOR IMPROVED COMPRESSION", filed Jul. 15, 2004 in the name of inventors Thomas G. O'Neill and Richard G. Fell, which is incorporated herein, in its entirety, by reference.

If, at DETERMINE IF IMAGE IS ANTI-ALIASED OPERATION 505, it is determined that the image provided at PROVIDE IMAGE OPERATION 503 is a not a two-color anti-aliased image, method 500 is exited at EXIT OPERATION 537. If, on the other hand, it is determined at DETERMINE IF IMAGE IS ANTI-ALIASED OPERATION 505 that the image provided at PROVIDE IMAGE OPERATION 503 is a two-color anti-aliased image, flow proceeds to READ IMAGE HEIGHT/WIDTH OPERATION 506 where the image height and width information is read from the image header. At ESTABLISH BASE COLORS OPERATION 507 the entire image is scanned to determine the two base colors. Those of skill in the art will readily recognize that READ IMAGE HEIGHT/WIDTH OPERATION 506 and ESTABLISH BASE COLORS OPERATION 507 can easily be combined into a single operation.

As noted above, according to the present invention, once two-color anti-aliased images are detected, a factor of three in compression is immediately achieved by using a single eight bit, one byte, value to represent the position along the line in color space, e.g., for the case R=G=B, it is enough to specify R.

At END OF IMAGE? OPERATION 521 a determination is made as to whether the present pixel is the end of the image. If the present pixel is the end of the image, flow proceeds to STORE/TRANSMIT COLOR/RUN DATA OPERATION 515 where the buffer containing the color information and the run length data for the entire image is stored and/or transmitted. Method 500 is then exited at EXIT OPERATION 537. If, on the other hand, at END OF IMAGE? OPERATION 521, it is determined that the present pixel is not the end of the image, flow proceeds to REPEATING PIXEL? OPERATION 523.

At REPEATING PIXEL? OPERATION 523 a determination is made as to whether the present pixel is a repeating pixel, i.e., is part of a run of pixels of the same color. If the present pixel is a repeating pixel then flow proceeds to ADD ONE TO RUN COUNTER (REPEAT COUNTER+1) OPERATION 531 and then to TRANSITION COUNTER GREATER THAN ZERO? OPERATION 551 where a determination is made as to whether a transition pixel counter has a count greater than zero, i.e., whether a transition pixel run is present.

If at TRANSITION COUNTER GREATER THAN ZERO? OPERATION 551, it is determined that transition pixel counter has a count greater than zero, then flow proceeds to PREPARE TO SAVE LAST GROUP OF TRANSITION PIXELS OPERATION 545. If, on the other hand, it is determined that transition pixel counter does not have a count greater than zero at to TRANSITION COUNTER GREATER THAN ZERO? OPERATION 551, then flow proceeds directly to IS RUN TOO LONG? OPERATION 533 where it is determined if the run is too large/long, i.e., the run length exceeds the fixed run length. If, at IS RUN TOO LONG? OPERATION 533, it is determined that the run length is too large then flow proceeds to SAVE CURRENT PIXEL RUN TO OUTPUT BUFFER OPERATION 535 where the current pixel run is saved to an output buffer and method 500 returns to END OF IMAGE? OPERATION 521. If, on the other hand, at IS RUN TOO LONG? OPERATION 533, it is determined that the run length is not too large, then method 500 returns directly to END OF IMAGE? OPERATION 521.

Returning to REPEATING PIXEL? OPERATION 523, if it is determined that the present pixel is not a repeating pixel, flow proceeds to RUN COUNTER GREATER THAN ZERO? OPERATION 525 where a determination is made as to whether the run counter has a count greater than zero, i.e., is there a pixel run pending. If, it is determined at RUN COUNTER GREATER THAN ZERO? OPERATION 525 that the run counter has a count greater than zero, flow proceeds to SAVE LAST PIXEL RUN TO OUTPUT BUFFER OPERATION 543 where the last pixel run is saved to the output buffer, ending at the previous pixel. The current pixel is then considered either a transition pixel or the beginning of a new pixel run. Method 500 then proceeds from SAVE LAST PIXEL RUN TO OUTPUT BUFFER OPERATION 543 to TRANSITION SLOPE CHANGE? OPERATION 541. If, on the other hand, it is determined at RUN COUNTER GREATER THAN ZERO? OPERATION 525 that the run counter does not have a count greater than zero, flow proceeds directly to TRANSITION SLOPE CHANGE? OPERATION 541.

At TRANSITION SLOPE CHANGE? OPERATION 541 a determination is made as to whether the present pixel represents a change in the slope of the transition, i.e., if the transition color has changed track from say, a lighter to darker transition, to a darker to lighter transition. If, at TRANSITION SLOPE CHANGE? OPERATION 541, a transition slope change is not detected, flow proceeds to ADD ONE TO TRANSITION COUNTER OPERATION 527 where the transition counter is incremented. Method 500 then returns to END OF IMAGE? OPERATION 521. If, on the other hand, at TRANSITION SLOPE CHANGE? OPERATION 541, a transition slope change is detected, flow proceeds to PREPARE TO SAVE LAST GROUP OF TRANSITION PIXELS OPERATION 545 where the last group of transition pixels are prepared for saving and/or transmitting and flow proceeds to SMALL NUMBER OF TRANSITION PIXELS? OPERATION 547.

At SMALL NUMBER OF TRANSITION PIXELS? OPERATION 547 a determination is made as to the number of transition pixels. If the number is less than, or equal to, a predefined number, in one embodiment three, then at SMALL NUMBER OF TRANSITION PIXELS? OPERATION 547 it is determined that the number of transition pixels is small and flow proceeds to SAVE EACH PIXEL COLOR RANGE TO OUTPUT BUFFER OPERATION 549. At SAVE EACH PIXEL COLOR RANGE TO OUTPUT BUFFER OPERATION 549 each pixel's color range is saved to the output buffer and method 500 then returns to END OF IMAGE? OPERATION 521. If, on the other hand, the number of transition pixels is greater than a predefined number, in one embodiment three, then at SMALL NUMBER OF TRANSITION PIXELS? OPERATION 547 it is determined that the number of transition pixels is not small and flow proceeds to SAVE NUMBER OF TRANSISITON PIXELS TO OUTPUT BUFFER OPERATION 555 where the number of transition pixels is saved to the output buffer. Method 500 then returns to END OF IMAGE? OPERATION 521.

Method 500 continues as described above, repeatedly, until at END OF IMAGE? OPERATION 521 a determination is made that the present pixel is the end of the image and flow proceeds to STORE/TRANSMIT COLOR/RUN DATA OPERATION 515 where the color information and the run length data for the entire image is stored and/or transmitted. Method 500 is then exited at EXIT OPERATION 537 until the next image is received.

Figure 6:
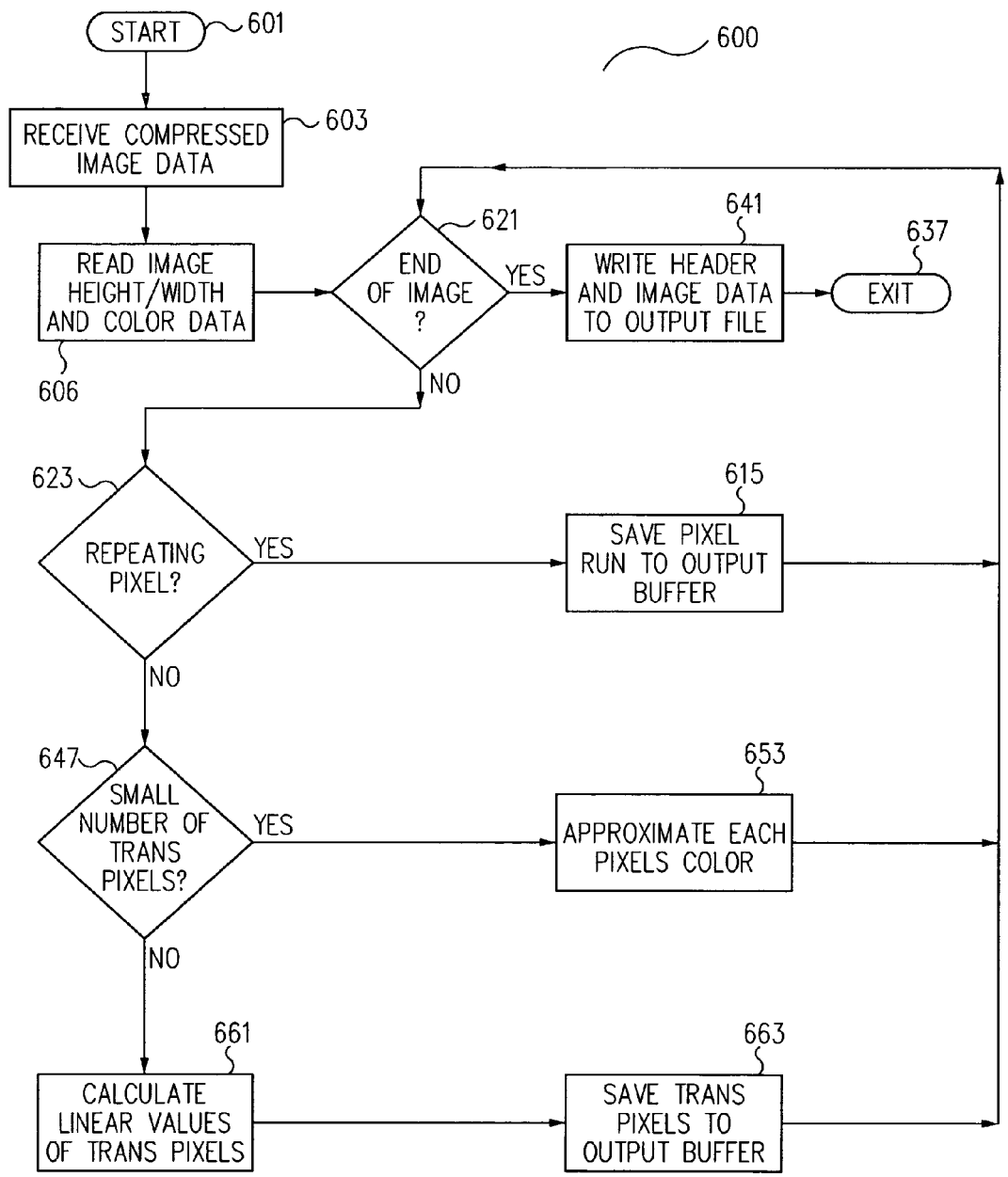
FIG. 6 shows a flow chart of one embodiment of a method for lossy decoding of two color anti-aliased source images in accordance with the principles of the invention.

FIG. 6 shows a flow chart of one embodiment of a method 600 for lossy decoding of two color anti-aliased source images in accordance with the principles of the invention. Method 600 starts at ENTER OPERATION 601 and proceeds to RECEIVE COMPRESSED IMAGE DATA OPERATION 603 where a compressed image, typically compressed by one embodiment of the invention, such as method 500 in FIG. 5, is received. At READ IMAGE HEIGHT/WIDTH AND COLOR DATA OPERATION 606 in FIG. 6, the height and width information for the image is read from the compressed image header.

At END OF IMAGE? OPERATION 621 a determination is made as to whether or not the present data is the end of the image. If it is determined at END OF IMAGE? OPERATION 621 that the present data is the end of the image, then at WRITE HEADER AND IMAGE DATA TO OUTPUT FILE OPERATION 641 the image header and a buffer containing the image data are written to an output file and method 600 is exited at EXIT OPERATION 637. If, on the other hand, it is determined at END OF IMAGE? OPERATION 621 that the present data is not the end of the image, a determination is made as to whether or not the present data represents a run of repeating pixels at REPEATING PIXELS? OPERATION 623.

If it is determined at REPEATING PIXELS? OPERATION 623 that the present data does not represent a run of repeating pixels, then flow proceeds to SAVE PIXEL RUN TO OUTPUT BUFFER OPERATION 615 where the present pixel run is saved to an output buffer. Method 600 then returns to END OF IMAGE? OPERATION 621. If, on the other hand, it is determined at REPEATING PIXELS? OPERATION 623 that the present pixel is not one of a run of repeating pixels, and then flow proceeds to SMALL NUMBER OF TRANSITION PIXELS? OPERATION 647.

At SMALL NUMBER OF TRANSITION PIXELS? OPERATION 647 a determination is made as to the number of transition pixels. If the number of transition pixels is less than a predefined number, in one embodiment three, then at SMALL NUMBER OF TRANSITION PIXELS? OPERATION 647 it is determined that the number of transition pixels is small and flow proceeds to APPROXIMATE EACH PIXEL COLOR OPERATION 653. At APPROXIMATE EACH PIXEL COLOR OPERATION 653 each pixel's approximate color is determined from the specified color range, then saved to the output buffer. The determination may be made based on a table look up or on a calculation. Method 600 then returns to END OF IMAGE? OPERATION 621. If, on the other hand, the number of transition pixels is equal to, or greater than, a predefined number, in one embodiment three, then at SMALL NUMBER OF TRANSITION PIXELS? OPERATION 647 it is determined that the number of transition pixels is not small and flow proceeds to CALCULATE LINEAR VALUES OF TRANSITION PIXELS OPERATION 661.

At CALCULATE LINEAR VALUES OF TRANSITION PIXELS OPERATION 661 the linear values of the transition pixel's color is calculated, in one embodiment, by taking the last pixel's color and the next pixel's color and averaging the two. Method 600 then proceeds to SAVE TRANSITION PIXELS TO OUTPUT BUFFER OPERATION 663.

At SAVE TRANSITION PIXELS TO OUTPUT BUFFER OPERATION 663 the transition pixel data from CALCULATE LINEAR VALUES OF TRANSITION PIXELS OPERATION 661 is saved to the output buffer and method 600 returns to END OF IMAGE? OPERATION 621.

Flow proceeds as described above, repeatedly, until it is determined at END OF IMAGE? OPERATION 621 that the present data is the end of the image, then at WRITE HEADER AND IMAGE DATA TO OUTPUT FILE OPERATION 641 the image header and image data is written to an output file and method 600 is exited at EXIT OPERATION 637.

The foregoing description of an implementation of the invention has been presented for purposes of illustration and description only, and therefore is not exhaustive and does not limit the invention to the precise form disclosed. Modifications and variations are possible in light of the above teachings or may be acquired from practicing the invention.

For instance, as noted above, for simplicity, in the discussion above focused on the case where the color space is RGB. However, those of skill in the art will readily recognize that the method of the present invention can easily be applied in any color space, e.g. YUV or YCbCr. Consequently, the scope of the invention is defined by the claims and their equivalents.

In addition, while the bulk of the discussion above was directed to the instance where horizontal rows of pixels were encoded, those of skill in the art will readily recognize that similar result is obtained using the method of the present invention when reading an image in vertical columns. Indeed, as noted above, simulations run by the Inventors of the present invention indicate that even greater compression can be achieved in certain cases when using the present invention and reading across image in a vertical column.

In addition, while the unique case where the two base colors are black and white is discussed frequently above, those of skill in the art will recognize that the present invention is equally applicable to any two color anti-aliased images.

In addition, while specific portions of the method of the invention are discussed and shown in the FIGS. with specific operations and flows of operations, those of skill in the art will readily recognize that this was done for illustrative purposes to allow various aspects of the invention to be described easily. However, those of skill in the art will also readily recognize the method can be performed in numerous ways, with different flows and that some, or all, of the operations shown in the FIGS. could be combined or re-arranged to meet the needs of the user and to accommodate differing implementation needs.

We claim:

1. A method to compress two color anti-aliased images comprising:
providing an image;
determining if said image is a two-color anti-aliased image;

exiting said method to compress two color anti-aliased images if said image is not a two-color anti-aliased image;

determining a first base color and a second base color of said image if said image is determined to be a two-color anti-aliased image;

detecting whether a run of two or more pixels of said first color is present;

determining that a pixel is a transition pixel if it is not part of a run of two or more pixels of said first color;

storing and/or transmitting said transition pixel data if a run of two or more pixels of said first color is not present;

encoding said first color if a run of two or more pixels of said first color is present;

encoding the number of pixels in said run of two or more pixels of said first color;

storing and/or transmitting said encoding or said first color and said encoding of said the number of pixels in said run of two or more pixels of said first color;

detecting whether a run of two or more pixels of said second color is present;

encoding said second color if a run of two or more pixels of said first color is present;

encoding the number of pixels in said run of two or more pixels of said second color; and storing and/or transmitting said encoding or said second color and said encoding of said the number of pixels in said run of two or more pixels of said second color.

2. A system to compress two color anti-aliased images comprising:

means for providing an image;

means for determining if said image is a two-color anti-aliased image;

means for exiting said system to compress two color anti-aliased images if said image is not a two-color anti-aliased image;

means for determining a first base color and a second base color of said image if said image is determined to be a two-color anti-aliased image;

means for detecting whether a run of two or more pixels of said first color is present;

means for determining that a pixel is a transition pixel if it is not part of a run of two or more pixels of said first color;

means for storing and/or transmitting said transition pixel data if a run of two or more pixels of said first color is not present;

means for encoding said first color if a run of two or more pixels of said first color is present;

means for encoding the number of pixels in said run of two or more pixels of said first color;

means for storing and/or transmitting said encoding or said first color and said encoding of said the number of pixels in said run of two or more pixels of said first color;

means for detecting whether a run of two or more pixels of said second color is present;

means for encoding said second color if a run of two or more pixels of said first color is present;

means for encoding the number of pixels in said run of two or more pixels of said second color; and means for storing and/or transmitting said encoding or said second color and said encoding of said the number of pixels in said run of two or more pixels of said second color.

* * * * *